United States Patent [19]

Gourlia et al.

[11] Patent Number: 4,826,574

[45] Date of Patent: May 2, 1989

[54] DISTILLATION COLUMN WITH HELICAL LIQUID FLOW AND DISSYMMETRIC SPACING OF THE TRAYS

[75] Inventors: Jean P. Gourlia; Marie-Florence Thiebaut, both of Lyons, France

[73] Assignee: Societe Nationale Elf Aquitaine, France

[21] Appl. No.: 15,939

[22] Filed: Feb. 18, 1987

[30] Foreign Application Priority Data

Feb. 18, 1986 [FR] France .................. 86 02186

[51] Int. Cl.⁴ .......................................... B01D 3/32
[52] U.S. Cl. ..................................... 202/158; 202/269; 261/114.1; 196/111; 208/347
[58] Field of Search ............... 202/158, 269; 196/111; 261/114.5, 114.1; 208/347

[56] References Cited

U.S. PATENT DOCUMENTS

| | | | |
|---|---|---|---|
| 3,364,124 | 1/1968 | Walker et al. | 202/158 |
| 3,434,701 | 3/1969 | Bauer | 202/158 |
| 4,028,191 | 6/1977 | Scott | 202/158 |
| 4,582,569 | 4/1986 | Jenkins | 202/158 |
| 4,664,785 | 5/1987 | Devos et al. | 208/354 |

FOREIGN PATENT DOCUMENTS

| | | | |
|---|---|---|---|
| 0057493 | 1/1981 | European Pat. Off. | 202/158 |
| 2577147 | 8/1986 | France . | |
| 0719197 | 11/1954 | United Kingdom | 202/158 |
| 1506393 | 4/1978 | United Kingdom | 202/158 |
| 2093712 | 9/1982 | United Kingdom | 202/158 |

OTHER PUBLICATIONS

Canfield, "Computer Simulation of the Parastillation Process"; AICHE; Jun. 1983, pp. 1-19.
Science/Technology Concentrates, "Separation Method Takes New Approach", C & EN, Jul. 11, 1983, p. 15.
Chemical Week, "Distillation with Less Energy", Oct. 19, 1983, pp. 31 & 32.

Primary Examiner—Kenneth M. Schor
Assistant Examiner—V. Manoharan
Attorney, Agent, or Firm—Ostrolenk, Faber, Gerb & Soffen

[57] ABSTRACT

A circular section column with helical liquid flow is divided by a vertical wall 10 into two gas and vapor tight sectors A and B, each sector housing a series of trays.

The trays disposed are designated respectively 1a, 2a and 3a for sector A and 1b, 2b and 3b for sector B.

The distance D separating each two successive half trays of a given series is constant.

On the other hand, the half-trays of one series are each staggered in the axial direction of the column with respect to the half-trays of the other series by a spacing d which is less than half the distance D.

This arrangement allows a greater number of half-trays to be housed in a column of a given height, or the height of a column for a given number of trays to be decreased.

6 Claims, 2 Drawing Sheets

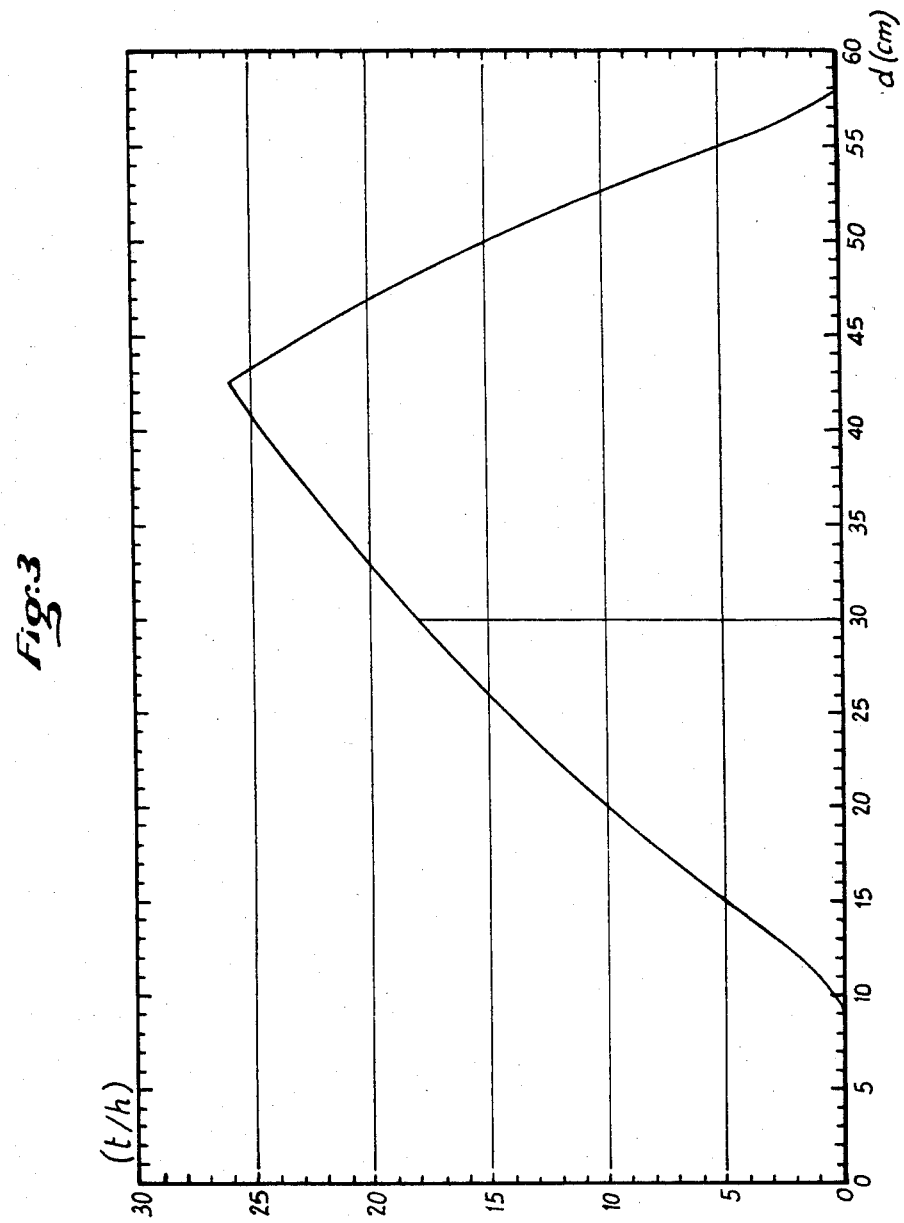

DISTILLATION COLUMN WITH HELICAL LIQUID FLOW AND DISSYMMETRIC SPACING OF THE TRAYS

BACKGROUND OF THE INVENTION

1. Field of the Invention

The present invention relates to tray distillation columns in which the gases and vapors subdivided into separate streams meet counter-currentwise a liquid phase flowing helically from one tray to another.

It relates more particularly to a distillation column in which the trays in the form of a semicircle are disposed alternately on each side of a continuous vertical wall and therealong, said wall dividing the column into two sectors sealed to the passage of the vapors, each of which houses a series of trays, the successive trays of the same series being separated by a fixed distance D, each tray having at one of its edges a liquid reception area and at the other a cut section forming the overflow, said reception areas and said overflows being situated alternately in the succession of superimposed trays sometimes at one side and sometimes at the other side of a plate, so that the liquid follows a helical path.

2. Related Art

Such columns are known and one of them is described in the French Pat. No. 85 01874 in the name of the applicant.

Please refer to FIG. 1. So as to maintain a high hourly distillation rate, attempts are made to provide maximum liquid and vapor flow rates in the column. The value of these flow rates determines the pressure loss of the gas and vapor stream rising from one tray to another. Furthermore, this pressure loss and the liquid flow rate govern the determination of the height h of the liquid filling the overflow well feeding each tray. This height h is a parameter which is taken into account at the time of designing the distillation column, particularly for determining the spacing D between the trays, which is usually of the order of 2 h, except in the case where driving of the liquid by the gas phase imposes a higher constraint.

The pressure loss $\Delta p$ of the gas and vapor stream rising from one tray to another is related both to this height h and to the spacing D of these successive trays.

In a conventional column providing a crossed stream of liquid with respect to the gas and whose design was defined by fixing the value of D with respect to the desired liquid flow rates, the spacing D between the successive trays is constant.

In fact, since the rising gases and vapors experience the same decrease of the pressure loss $\Delta p$, whereas the downgoing liquid meets the same pressure increase $\Delta p$ in each gap between successive trays, there is no reason to design any dissymmetric spacing between successive trays.

It is quite different for a half plate column with helical flow of the liquid. Let it be assumed that, in such columns, the gases of a given stream rising inside a given sector of the column continue to experience an equal decrease of the pressure loss $\Delta p$ from one tray to another. In such case, it is possible for liquid, (depending on whether it passes during its helical travel for example from left to right or from right to left,) to sometimes meets, when changing sector, the same pressure when passing from a half tray of a first sector to another half tray of the second sector, above which trays, called plates of the same order or isobars, the same pressure exists. On the other hand, it is possible for the liquid to sometimes meet a different pressure when passing from a half tray of the second sector to another half tray of the first sector, where a pressure exists that is increased by a pressure loss $\Delta p$, with respect to the first half tray.

SUMMARY OF THE INVENTION

The present invention is based then on the idea of introducing, in distillation columns with helical flow of the liquid, a dissymmetry in the spacing of the half trays and it is characterized in that the series of half trays of one sector is offset in the axial direction of the column with respect to the series of half trays of the other sector by a distance d less than half the spacing D between the trays of each sector.

The advantage of such an arrangement is that it allows either a large number of half trays to be housed in a column of given length or, for a required number of trays, the height of the column to be reduced.

BRIEF DESCRIPTION OF THE DRAWINGS

The invention will be illustrated in greater detail with the help of the drawings, in which:

FIG. 3 shows a graph illustrating the variation of the maximum admissible pressure as a function of the spacing d of a half tray of one sector with respect to the two half trays of the other sector of the column.

DETAILED DESCRIPTION

Figure 1:
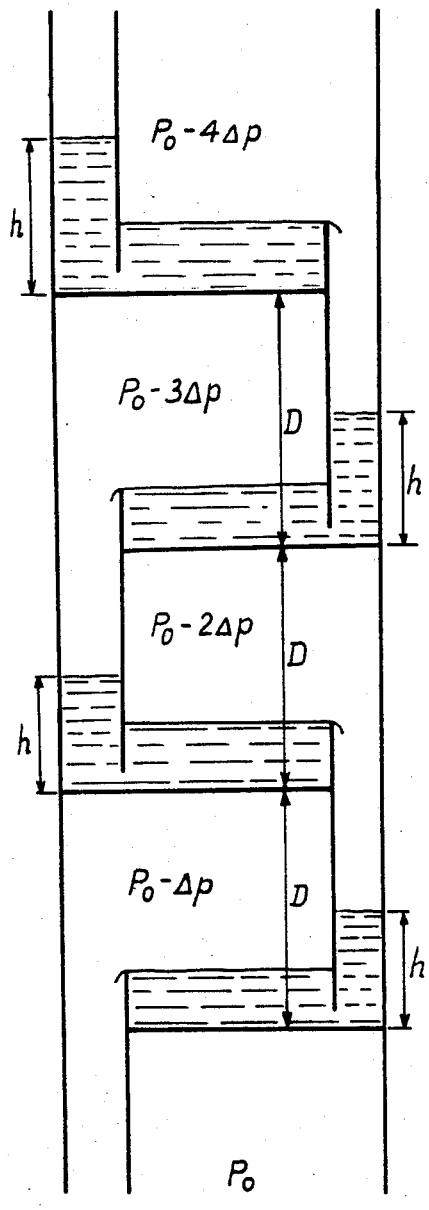
FIG. 1 shows a schematical view of a conventional column portion with superimposed trays providing a crossed stream of liquid with respect to the gas.

In a conventional column shown in FIG. 1, depending on the operating conditions and in particular on the pressure of the vapors and flow rates, in the overflow well for the liquid feeding the superimposed trays, a clear liquid level h is established, a part of which counterbalances the pressure loss $\Delta p$ which the streaming liquid meets from one tray to another in which gap between the trays. Thus, if the pressure in the gap between a pair of trays at the gas inlets is Po, this pressure takes on the values $Po-\Delta p$, $Po-2\Delta p$, $Po-3\Delta p$, and so on, in the gaps between the pairs of upper trays. Since this pressure loss is identical between each pair of trays and since the operating conditions remain stable, the distance D separating the two superimposed trays remains identical and usually equal to 2 h.

Figure 2:
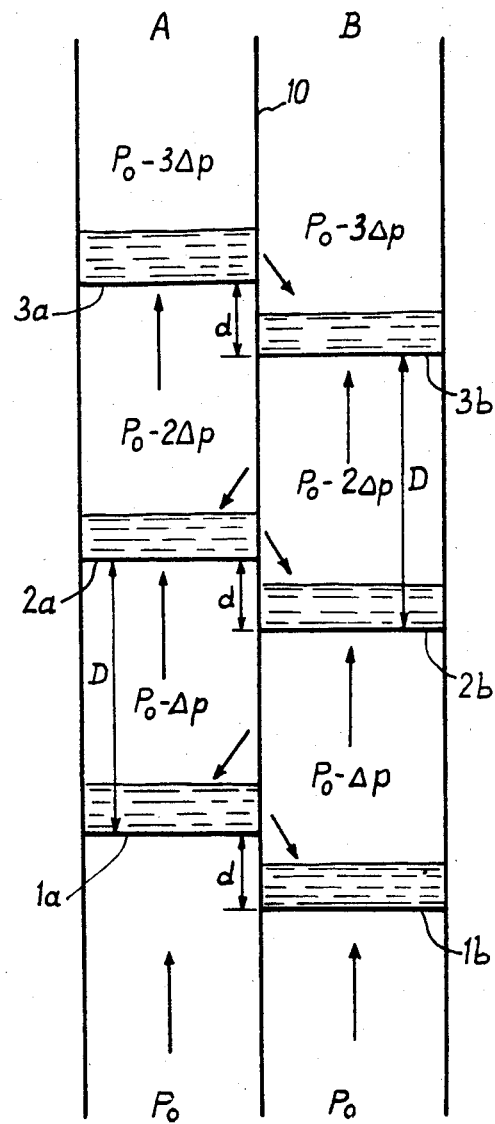
FIG. 2 shows a schematical view of a column portion having half trays offset axially with respect to the liquid in the helical direction, in accordance with the invention.

A circular section column with helical liquid flow (FIG. 2) is divided by a vertical wall 10 into two gas and vapor tight sectors A and B, each sector housing a series of trays.

The trays disposed are designated respectively 1a, 2a, 3a for sector A and 1b, 2b, 3b for sector B. The distance D separating two successive half trays of the same series is constant. On the other hand, the half trays of a series are staggered in the axial direction of a column with respect to the half trays of the other series by a spacing d which is less than half D.

The liquid flowing from left to right in the isobar trays of the same order, namely passing sucessively from trays 3a, 2a, 1a towards trays 3b, 2b, 1b meets everywhere a medium at the same pressure. In a different way, the liquid flowing from right to left, namely passing respectively from trays 3b, 2b, towards trays 2a, 1a meets every time a pressure greater by Δp than that which it has just left. As was mentioned above, the distance between the successive trays depends, among other things, on the pressure loss at the level of the gas rising up the trays which it is a question of counterbalancing by means of an adequate liquid head in the overflow well.

The absence of loss of head, when the liquid meets a tray where the same pressure reigns so that of the tray which it has just left, allows the two successive trays to be moved closer together, as is the case with the trays of the same isobar order 1a and 1b, 2a and 2b 3a and 3b.

Since the last trays of the same series remain separated by a constant distance D, the operating conditions for the vapor phase remain good.

On the other hand, since a liquid head must be maintained in the overflow well between the trays showing a loss of head, namely 3b and 2a, 2b and 1a, this aim is reached through the spacing D-d between the trays of the same sector.

The offset d of the half tray of one sector with respect to the half tray of the same vapor or liquid passage order, namely the spacing between the half trays belonging to the different sectors but situated in the same vapor or liquid passage order, may vary between 0.4 and 0.15 D, or more particularly is equal to about 0.3 D.

The graph shown in FIG. 3 illustrates the variation of the maximum admissible liquid pressure as a function of the ordinate d, when the value of this latter is varied between the limits O and D that is to say varying the spacing of one half tray of a sector with respect to the distance separating the two half trays of the opposite sector. It has proved that, for a petrol or gasoline stabilizing column in which the distance between two successive half trays of the same sector is 600 mm, the maximum admissible liquid pressure is not to be found for an equidistance, that is to say when the half tray of one sector is halfway between the two half tray of the opposite sector (300 mm). It can be seen that the optimum is reached for a value of about 150 mm with respect to the half tray of the same order (isobar) belonging to the opposite sector, which corresponds to the value of about 450 mm for the spacing with respect to the other half tray of a different order belonging to the opposite sector. These distances place the half tray 1a respectively at 150 mm from tray 1b and at 450 mm from tray 2b.

We claim:

1. A tray distillation column comprising:
   a respective plurality of semicircular trays disposed alternately on each side of a continuous vertical wall therealong, said wall dividing the column into two vapor tight sectors, each of which houses a respective series of said trays, each of the successive trays of the same series being separated by a fixed distance D, each tray having at one of its edges a liquid reception area and at the other a cut section forming an overflow, said reception areas and said overflows being situated alternately in the succession of superimposed trays on one side and on the other side of a tray, so that fluid follows a helical path in said column,
   the series of half trays of one sector being offset in the axial direction of the column with respect to the other series of the other sector by a distance d less than half the distance D.

2. A column according to claim 1, wherein the offset distance d between the half trays belonging to the different sectors but situated in the same fluid passage order is between 0.4 and 0.15 D.

3. A column according to claim 2, wherein the offset distance d between the half trays belonging to the different sectors but situated in the same fluid passage order is about 0.25 D.

4. A petrol stabilization column comprising:
   a respective plurality of semicircular trays disposed alternately on each side of a continuous vertical wall therealong, said wall dividing the column into two vapor tight sectors, each of which houses a respective series of said trays, each of the successive trays of the same series being separated by a fixed distance D, each tray having at one of its edges a liquid reception area and at the other a cut section forming an overflow, said reception areas and said overflows being situated alternately in the succession of superimposed trays on one side and on the other side of a tray, so that fluid follows a helical path in said column,
   the series of half trays of one section being offset in the axial direction of the column with respect to the other series of the other sector by a distance d less than half the distance D;
   wherein the offset distance d is equal to about 0.3 D.

5. A petrol stabilization column comprising:
   a respective plurality of semicircular trays disposed alternately on each side of a continuous vertical wall therealong, said wall dividing the column into two vapor tight sectors, each of which houses a respective series of said trays, each of the successive trays of the same series being separated by a fixed distance D, each tray having at one of its edges a liquid reception area and at the other a cut section forming an overflow, said reception areas and said overflows being situated alternately in the succession of superimposed trays on one side and on the other side of a tray, so that fluid follows a helical path in said column,
   the series of half trays of one section being offset in the axial direction of the column with respect to the other series of the other sector by a distance d less than half the distance D;
   wherein the offset distance d between the half trays belonging to the different sectors but situated in the same fluid passage order is between 0.4 and 0.15 D.

6. A column according to claim 5, wherein the offset distance d between the half trays belonging to the different sectors but situated in the same fluid passage order is about 0.25 D.

* * * * *